(12) United States Patent  (10) Patent No.: US 7,100,621 B2
Johnson  (45) Date of Patent: Sep. 5, 2006

(54) SIDETRACK VEHICLE WASHER WITH ROTATING SPRAY ARM

(75) Inventor: Archie L. Johnson, Phoenix, AZ (US)

(73) Assignee: Superior Investments, Inc., Phoenix, AZ (US)

( * ) Notice: Subject to any disclaimer, the term of this patent is extended or adjusted under 35 U.S.C. 154(b) by 473 days.

(21) Appl. No.: 10/431,732

(22) Filed: May 8, 2003

(65) Prior Publication Data

US 2004/0221878 A1    Nov. 11, 2004

(51) Int. Cl.
 *B08B 3/02* (2006.01)
(52) U.S. Cl. ............................. 134/123; 134/113
(58) Field of Classification Search ............... 134/113, 134/45, 123
 See application file for complete search history.

(56) References Cited

U.S. PATENT DOCUMENTS

| | | | | |
|---|---|---|---|---|
| 2,676,600 A | * | 4/1954 | Vani et al. ............... | 134/123 |
| 3,072,130 A | * | 1/1963 | Grabenhorst ............ | 134/100.1 |
| 3,167,797 A | * | 2/1965 | Hergonson ............... | 15/3 |
| 3,300,803 A | | 1/1967 | Seakan ..................... | 15/21 |
| 3,391,701 A | * | 7/1968 | Richardson et al. ..... | 134/123 |
| 3,425,080 A | | 2/1969 | Dolitzsch et al. ........ | 15/21 |
| 3,428,983 A | | 2/1969 | Seakan ..................... | 15/21 |
| 3,443,993 A | * | 5/1969 | Loop et al. ............... | 134/123 |
| 3,496,908 A | * | 2/1970 | Bernardi .................. | 118/684 |
| 3,529,611 A | * | 9/1970 | Daum et al. .............. | 134/112 |
| 3,543,774 A | * | 12/1970 | Trasp ........................ | 134/57 R |
| 3,573,862 A | | 4/1971 | Brown ...................... | 134/57 |
| 3,593,730 A | | 7/1971 | Burchett ................... | 134/123 |
| 3,595,250 A | * | 7/1971 | Hurst ........................ | 134/45 |
| 3,596,241 A | * | 7/1971 | Migneault ................ | 340/932.2 |
| 3,599,650 A | | 8/1971 | Abraham .................. | 134/123 |
| 3,604,434 A | * | 9/1971 | Hurst ........................ | 134/58 R |
| 3,645,282 A | | 2/1972 | Kurronen .................. | 134/45 |
| 3,650,281 A | | 3/1972 | Hurst ........................ | 134/58 |
| 3,701,356 A | | 10/1972 | Hanna et al. ............. | 134/58 |
| 3,786,823 A | * | 1/1974 | Wiley ....................... | 134/45 |
| 4,305,174 A | | 12/1981 | Pyle et al. ................ | 15/53 |
| 4,453,284 A | | 6/1984 | Schleeter ................. | 15/97 |
| 4,848,383 A | | 7/1989 | Buhler ..................... | 134/123 |
| 4,913,357 A | * | 4/1990 | Bolyard et al. .......... | 239/751 |

(Continued)

OTHER PUBLICATIONS

"ULTRA Touch Free Rollover Car Wash System" brochure by *Broadway Equipment Company* (published sometime before May 8, 2002).

(Continued)

*Primary Examiner*—Frankie L. Stinson
(74) *Attorney, Agent, or Firm*—Cahill, von Hellens & Glazer, P.L.C.

(57) ABSTRACT

A vehicle washing apparatus includes a side track extending along a washing bay. A gantry is supported for reciprocal motion along the side track by a gantry motor. Sensors detect the front and rear ends of the vehicle to control movement of the gantry. A retractable carriage extends from the gantry across the washing bay under the control of a carriage motor and a vehicle width sensor. The carriage rotatably supports a spray bar for discharging cleaning fluid. A motor rotates the spray bar to sweep around corners of the vehicle. A cam plate and engagement roller index the spray bar orientation, while limiting spray bar rotation to a single direction. A wheel guide receives the front left vehicle wheel. Treadle switches in the wheel guide, in conjunction with an illuminated display, indicate to the user when the vehicle is properly indexed in the washing bay.

21 Claims, 12 Drawing Sheets

U.S. PATENT DOCUMENTS

| | | | |
|---|---|---|---|
| 4,933,016 A * | 6/1990 | Carlson | 134/18 |
| 5,016,662 A | 5/1991 | Crotts et al. | 134/45 |
| 5,033,490 A | 7/1991 | Wade et al. | 134/123 |
| 5,040,485 A * | 8/1991 | Bailey et al. | 118/680 |
| 5,160,430 A | 11/1992 | Gasser et al. | 210/138 |
| 5,255,695 A | 10/1993 | Downey | 134/123 |
| 5,291,906 A * | 3/1994 | White | 134/123 |
| 5,575,852 A | 11/1996 | Chase | 118/680 |
| 6,283,135 B1 | 9/2001 | Fratello et al. | 134/123 |
| 6,325,863 B1 | 12/2001 | Zamensky et al. | 134/18 |
| 6,372,053 B1 * | 4/2002 | Belanger et al. | 134/34 |
| 6,508,260 B1 * | 1/2003 | Anderson | 134/113 |
| 6,661,516 B1 * | 12/2003 | Dietsch et al. | 356/399 |

OTHER PUBLICATIONS

"It's Time f r a Chang" brochure by *Vector Rapid Wash* (published sometim before May 8, 2002).

"The touch-free vehicle washer with intelligence." brochure by *Superior Car Wash Systems, Inc.* (publishing curing 2001).

"Orbiter T uch-Free Automatic" brochure by *Southern Pride Car Wash Systems* (published s metime bef re May 8, 2002).

* cited by examiner

SIDETRACK VEHICLE WASHER WITH ROTATING SPRAY ARM

BACKGROUND OF THE INVENTION

1. Field of the Invention

The present invention relates generally to vehicle washing apparatus, and more particularly to vehicle washing apparatus wherein the vehicle to be washed is temporarily parked within a washing bay during cleaning operations.

2. Description of the Related Art

High volume vehicle washers typically move the vehicles to be washed past fixed-location washing devices. The vehicles to be washed are either slowly driven through such equipment, or are towed through such equipment by conveyor systems. While such drive-through washers can handle high volumes of vehicles, they are also relatively expensive and require a significant amount of space.

Less-expensive "rollover" vehicle washers are also known in the art wherein an archway, or bridge structure, rolls back and forth over the vehicle to be washed. In some cases, such rollover vehicle washers roll along a pair of spaced floor rails that extend along opposing sides of the vehicle to be washed. In other cases, a movable overhead carriage is supported for reciprocating forward/backward movement above the vehicle by an overhead framework supported by floor-mounted columns. Examples of such rollover vehicle washers are disclosed in U.S. Pat. Nos. 3,300,803 and 3,428,983, both to Seakan, U.S. Pat. No. 3,425,080 to Dolitzsch et al., U.S. Pat. No. 4,453,284 to Schleeter, U.S. Pat. No. 5,016,662 to Crotts, et al., and U.S. Pat. No. 6,283,135 to Fratello, et al. Rollover vehicle washers are often used by car dealerships, auto service centers, and other commercial businesses that are not dedicated car wash facilities.

Other washing systems are also known wherein a generally rectangular-shaped overhead guide track (usually having rounded corners) is suspended above a car-washing bay, and a movable washing apparatus is driven around such guide track to encircle the vehicle. Examples of such washing systems are shown in U.S. Pat. No. 3,593,730 to Burchett, in U.S. Pat. No. 3,650,281 to Hurst, and in U.S. Pat. No. 5,291,906 to White.

Still other washing systems are known wherein an overhead carriage is supported by a floor-mounted frame for reciprocal movement back and forth along the length of a vehicle washing bay, while a further reciprocating trolley moves from side to side along the width of the overhead carriage. The trolley supports one or more L-shaped wash arms to direct cleaning fluid at the vehicle to be washed. Examples of this type of washing system are disclosed in U.S. Pat. No. 4,933,016 to Carlson, and in U.S. Pat. No. 6,372,053 to Belanger, et al. These L-shaped wash arms are rotated through an arc of ninety degrees as the reciprocating carriage approaches the opposing ends of the wash bay; in this manner, the L-shaped wash arms round the corner of the vehicle to reach the front or rear surfaces of the vehicle.

Known vehicle washing systems that employ overhead carriages supported by a floor-mounted frame surrounding the washing bay often require significant floor space. The same is true for rollover machines that require rails on both sides of the washing bay to support the rolling washing archway.

In the vehicle washing industry, there is a current preference for so-called "touch-free" washing apparatus which avoids any physical contact between the washing apparatus and the vehicle, apart from streams of washing/rinsing fluid and/or streams of drying air. Such "touch-free" systems are less likely to damage projecting vehicle components such as side mirrors, antennas and the like. However, touch-free washing systems are more effective if the spray nozzles of the washing apparatus can be maintained in relatively close proximity to the surface of the vehicle. Otherwise, the sprayed cleaning fluid disperses too much before reaching the vehicle surface, and is not as effective in removing dirt and grime. Vehicles can vary greatly in width, and it is a challenge to accommodate vehicles having a range of widths while still maintaining the spray nozzles closely proximate to the vehicle surface for effective cleaning.

On occasion, a spray washing arm will inadvertently contact a projecting portion of a vehicle. This might happen, for example, if an oversized side-view mirror projects from one or both sides of the vehicle. To avoid extensive damage to the vehicle, washing apparatus manufacturers have constructed such washing arms using so-called break-away joints. If a force exceeding some predetermined magnitude is exerted upon such break-away joint, a special breakable pin, or some other frangible element, fractures and allows the joint to swing freely to avoid damage. Once broken, the break-away joint must be repaired to return it to its original condition.

In order for a roll-over type washing system to function at maximum efficiency, the vehicle must be positioned in a known position within the washing bay. It is known to install wheel guide rails in washing bays to form a wheel track for receiving one of the wheels of the vehicle, typically the front left wheel of the vehicle. The guide rails force the vehicle wheel into a fixed lateral (side-to side) position within the washing bay. In order to properly index the forward-rearward position of the vehicle, the wheel track may include a depressed trough which skilled drivers can sense as the vehicle wheel enters the trough. However, the lay driver often has difficulty detecting whether the vehicle wheel has registered with the depressed trough or not. In these instances, the vehicle may not be pulled into the bay far enough, or it might be pulled too far into the washing bay.

Apart from ensuring that the front end of the vehicle to be washed is properly indexed in the washing bay, additional difficulties arise by reason of different vehicles having different lengths. If the washing apparatus is to do a thorough job of cleaning the rear surfaces of the vehicle, then the spray nozzles of the vertical portion of the washing arm must be swept in close proximity to the rear end of the vehicle. On the other hand, assuming that the length of travel of a rollover washing apparatus in the forward/backward direction is fixed at some average length, then the washing arm will not be positioned close enough to the rear surfaces of shorter-than-average cars, and the washing arm may be positioned too close too, and actually impact, the rear surfaces of longer-than-average vehicles.

Accordingly, it is an object of the present invention is to provide such a vehicle washing apparatus which effectively washes a vehicle and which requires relatively little floor space.

Another object of the present invention is to provide such a washing apparatus which easily accommodates vehicles of varying widths while maintaining washing fluid spray nozzles relatively close to the surfaces of the vehicle being washed.

A further object of the present invention is to assist a lay user in detecting whether the vehicle has been pulled into the washing bay by the appropriate distance to properly index the vehicle within the washing bay.

Still another object of the present invention is to maintain the vertical portion of a washing arm essentially vertical during washing operations while still permitting the washing arm to move away from such vertical position in those instances wherein the washing arm actually contacts a portion of the vehicle in order to avoid excessive damage to the vehicle.

A still further object of the present invention is to provide such a washing apparatus which positions the spray nozzles of the washing arm in relatively close proximity to rear surfaces of the vehicle to be washed, irrespective of the length of the vehicle to be washed.

A yet further object of the present invention is to provide such a washing apparatus which is relatively inexpensive but which reliably and efficiently cleans the front, rear, side and top surfaces of a wide range of vehicles.

These and other objects of the present invention will become more apparent to those skilled in the art as the description of the present invention proceeds.

SUMMARY OF THE INVENTION

Briefly described, and in accordance with a preferred embodiment thereof, the present invention relates to a vehicle washing apparatus that includes a washing bay for accommodating a vehicle to be washed, and a side track that extends along one side of the washing bay. A gantry is movably supported by the side track for reciprocal forward and backward movement along one side of the washing bay. A gantry motor secured to the gantry selectively propels the gantry forward and backward along the side track. A lateral support extends from the upper end of the gantry, in cantilevered fashion, above and partially across, the vehicle washing bay. A washing arm generally resembling an inverted L is rotatably supported relative to the lateral support for rotation about a substantially vertical axis. The washing arm has a generally horizontal portion and a generally vertical portion; the generally vertical portion includes spray nozzles for directing cleaning fluid at vertical surfaces of the vehicle to be washed, and the generally horizontal portion includes spray nozzles for directing cleaning fluid at horizontal surfaces of the vehicle to be washed. A wash arm motor is coupled to the washing arm for selectively rotating the washing arm to sweep the spray nozzles around corners of the vehicle to be washed.

Preferably, the side track includes upper and lower guide rails, and the gantry includes at least one upper rail wheel for rolling along the upper guide rail, and at least one lower rail wheel for rolling along the lower guide rail. One or more high pressure fluid pumps and/or reservoirs of cleaning fluids can be supported by the gantry for movement therewith for pumping cleaning fluid to the washing arm during operation.

To aid the washing arm in sweeping around the front and rear corners of the vehicle to be washed, front end and/or rear end sensor elements can be provided for reciprocal forward and rearward movement with the gantry to sense that the gantry is disposed proximate the front end or rear end, respectively, of the vehicle to be washed.

In a preferred embodiment of the present invention, a single wash arm is rotatably supported from a carriage that extends or retracts laterally from the aforementioned lateral support for side-to-side movement therealong. Ideally, the wash arm motor is also supported by the carriage for side-to-side movement therewith. The washing arm drive axis may include a drive gear, and a drive belt may extend between the wash arm motor and the drive gear of the washing arm. A separate carriage motor is provided to selectively move the carriage between retracted and extended positions along the lateral support. For example, the carriage motor might retract the carriage when the driver's side of the vehicle is being washed, extend the carriage as the washing arm is swept across the front end of the vehicle, and then maintain the carriage in an extended position as the washing arm is moved across the passenger's side of the vehicle.

As mentioned above, vehicles to be washed may have greatly varying widths, and cleaning efficiency requires that the washing arm be maintained relatively close to all vertical surfaces of the vehicle. Accordingly, in the preferred embodiment of the present invention, a vehicle width sensor element is mounted for reciprocal side-to-side movement with the carriage to sense the relative width of the vehicle to be washed. In turn, the vehicle width sensor element is used to determine the degree to which the carriage should be extended from the lateral support in order to maintain the vertical portion of the spray arm relatively close to the side of the vehicle that lies opposite the gantry. For example, if the gantry extends along the driver's side of the vehicle to be washed, then the vehicle width sensor element is used to determine the relative position of the passenger's side of the vehicle. For purposes of safety, a limit sensor may also be provided for sensing that the carriage has advanced to a fully extended position before sensing the width of the vehicle. This limit sensor is used to prevent the carriage motor from attempting to further extend the carriage in search of the passenger's side of the car. A similar limit sensor may be used to detect that the carriage has been fully retracted within the lateral support to prevent the carriage motor from attempting to further retract the carriage.

According to another aspect of the present invention, a vehicle washing apparatus includes a vehicle washing bay for accommodating a vehicle to be washed, a movable support member adapted to be moved generally between the rear end and the front end of the washing bay, and a generally inverted L-shaped washing arm having a generally horizontal portion and a generally vertical portion, the generally vertical portion including spray nozzles for directing cleaning fluid at vertical surfaces of the vehicle to be washed. The movable support member rotatably supports the washing arm, via a bearing, above the vehicle washing bay for positioning the washing arm at different points within the vehicle washing bay. A generally circular cam plate is secured to the washing arm for rotation therewith. The outer periphery of cam plate has a series of four indexing grooves formed at ninety degree intervals. A roller or other engaging member bears against the outer periphery of the cam plate, and engaging one of the four grooves to index the washing arm at one of four orientations (left side of the vehicle, front of the vehicle, right side of the vehicle, and rear of the vehicle).

Preferably, a washing arm motor is also provided on the movable support member and is coupled to the washing arm rotation shaft for selectively rotating the washing arm and the cam plate secured thereto. The washing arm motor rotates the washing arm to sweep the spray nozzles around a corner of the vehicle to be washed. A cam position sensor, e.g., a proximity switch, is provided for sensing that one of the four indexing grooves of the cam plate is substantially aligned with the roller or other engaging member. In that case, the washing arm motor turns off to discontinue further rotation of the washing arm. Ideally, the cam plate outer periphery has a flattened region adjacent each of the four grooves formed therein. These flattened regions allow the roller or other engaging member to be dislodged from the indexing grooves onto the corresponding adjacent flat when the washing arm motor begins each quarter turn rotation. On the other hand, these indexing grooves resist rotation of the cam plate, and hence rotation of the washing arm in the opposite direction. This feature is helpful in preventing the washing arm from being dragged against the vehicle if the washing arm strikes a side mirror or other obstruction.

Another aspect of the present invention relates to a coupling joint formed between the vertical and horizontal portions of the washing arm for allowing the vertical portion of the washing arm to yield upon contact with the vehicle and/or a projection (such as a side view mirror) extending from the vehicle. The coupling joint preferably includes a first spring-biased detent that ordinarily maintains the vertical and horizontal portions of the washing arm at a predetermined angle of approximately 90 degrees relative to one another during operation of the vehicle washing apparatus. If the vertical portion of the washing arm were to contact the vehicle while the washing arm extends parallel to the longitudinal axis of the washing bay, the first spring-biased detent yields under the applied force to permit the vertical portion of the washing arm to tilt away from its normal vertical orientation, and to change the angle between the vertical and horizontal portions of the washing arm from the original predetermined angle.

Ideally, the coupling joint also includes a second spring-biased detent that ordinarily maintains the vertical portion of the washing arm substantially parallel to the washing arm's vertical axis of rotation during normal operation. However, should the vertical portion of the washing arm contact a projection extending from the vehicle while the washing arm extends perpendicular to the longitudinal axis of the washing bay, the second spring-biased detent yields under the applied force to permit the vertical portion of the washing arm to extend at an angle relative to the washing arm's vertical axis of rotation.

Still another aspect of the present invention relates to a configuration of the vertical portion of the washing arm that allows for thorough washing of lower portions of the vehicle while lessening the risk of catching the washing arm on a projection extending from the vehicle. In this regard, the washing arm is rotatably supported for rotation about a substantially vertical rotation axis. The vertical portion of the washing arm including a lowermost section and a mid-section. The lowermost section has a first spray nozzle for directing cleaning fluid at lower portions of the vehicle to be washed, and the mid-section has a second spray nozzle for directing cleaning fluid at elevated portions of the vehicle to be washed. The first nozzle is disposed more closely to the vertical rotation axis than the second nozzle. This allows the first nozzle to be positioned relatively close to the lower portions of the vehicle, while the second spray nozzle is spaced further away to avoid contact with side view mirrors or other projections extending from the vehicle.

Yet another aspect of the present invention relates to an improved vehicle washing apparatus for accurately indexing the position of the vehicle to be washed within the washing bay. A vehicle washing bay is provided for accommodating a vehicle to be washed. The vehicle washing bay includes a longitudinal axis extending from a rear end of the washing bay to an opposing front end of the washing bay; it also includes a lateral axis extending between opposing left and right sides of the vehicle washing bay. A movable support member is adapted to be moved generally between the rear end and the front end of the washing bay for directing cleaning fluid along the vehicle to be washed. A wheel guide is disposed within the vehicle washing bay for receiving one of the front wheels of the vehicle to be washed, and for guiding the vehicle to a known position relative to the lateral axis of the washing bay. A first sensor, which might take the form of a treadle switch or pressure sensitive mat, is positioned within the washing bay at a first predetermined index point for sensing that one of the front wheels is properly positioned over (or proximate to) the first sensor. A first visual indicator, for example, an illuminated "Stop" sign, is displayed at a point where it will be visible to a driver of the vehicle. The first visual indicator is coupled to the first sensor for providing a visual indication to the driver that the front wheel of the vehicle is properly positioned at the desired index point. Preferably, a second sensor, which may again be a treadle switch or pressure sensitive mat, if desired, is positioned at a point located just beyond the desired index point. This second sensor detects that a front wheel of the vehicle is positioned over (or proximate to) the second sensor, and hence beyond the first sensor, and creates a corresponding second signal. A second visual indicator (for example, a light that illuminates to display the warning "Back Up"), visible to the driver, is coupled to the second sensor for providing a visual indication that the front wheel has advanced beyond the desired index point.

DETAILED DESCRIPTION OF THE PREFERRED EMBODIMENT

Figure 1:
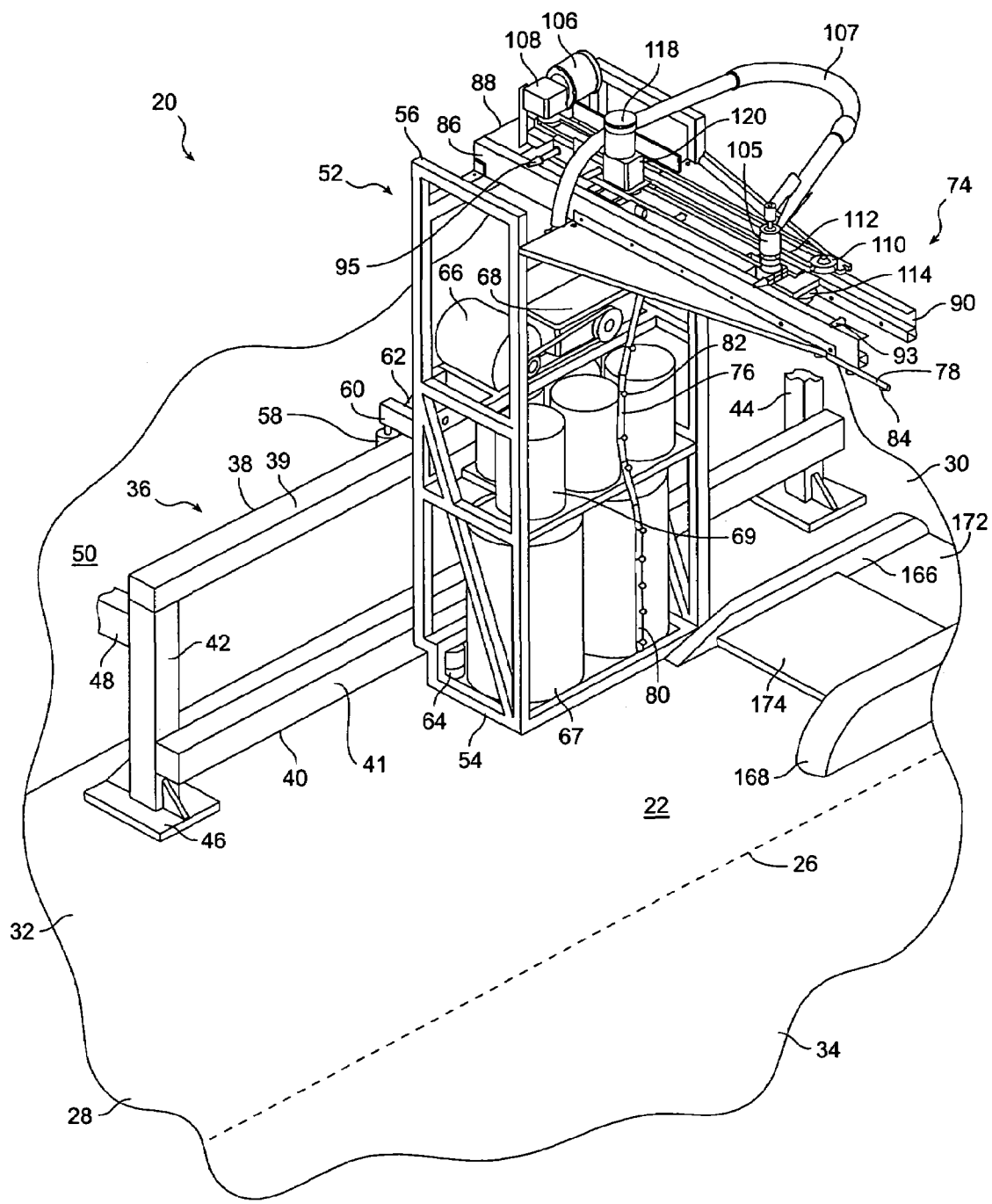
FIG. 1 is a perspective view of a vehicle washing apparatus constructed in accordance with the teachings of the present invention.
Figure 2:
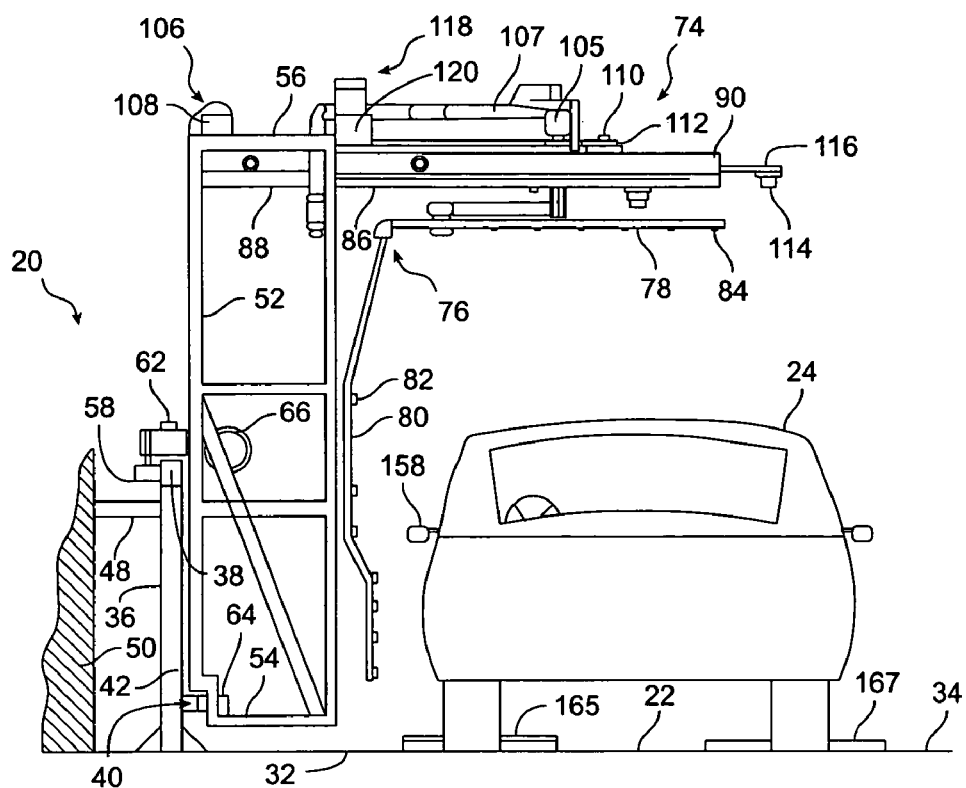
FIG. 2 is an elevational view of the washing apparatus as viewed from the rear end (or entry port) of the washing bay and showing a spray bar in position for cleaning the driver's side of a vehicle.
Figure 3:
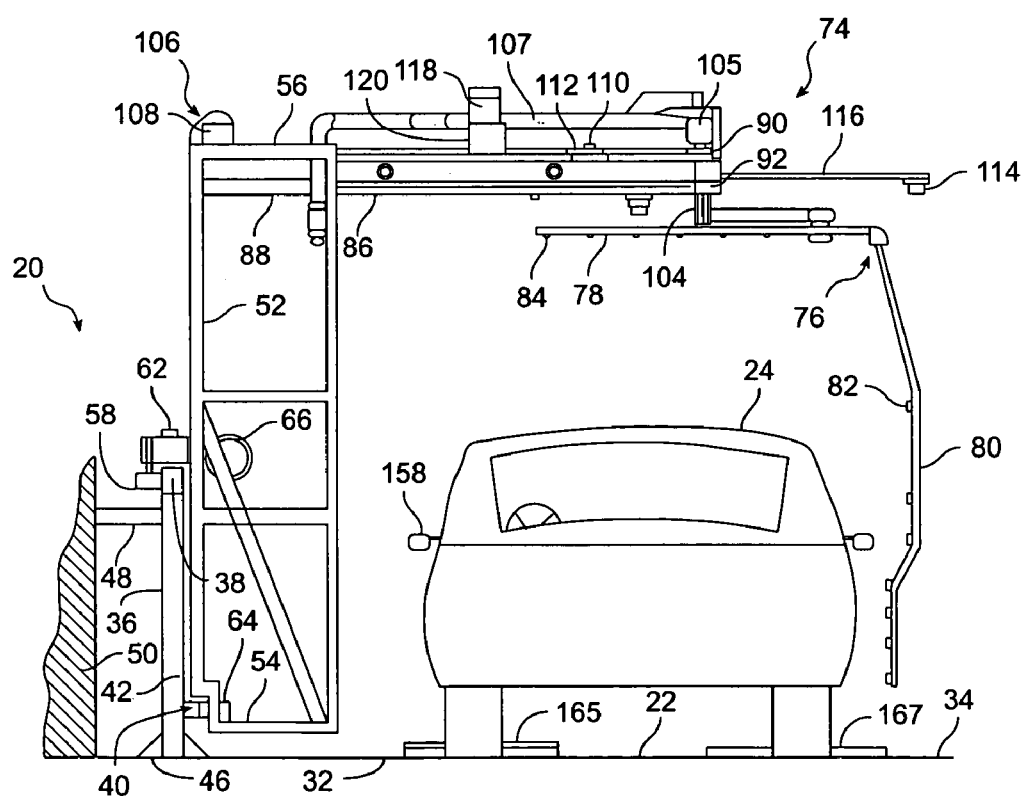
FIG. 3 is an elevational view similar to that shown in FIG. 2, but showing the spray bar in position for cleaning the passenger's side of the vehicle.

A vehicle washing apparatus incorporating a preferred embodiment of the present invention is shown in FIGS. 1–3, and is designated generally by reference numeral 20. Vehicle washer 20 includes a vehicle washing bay 22 for accommodating a vehicle 24 to be washed.

Washing bay 22 extends along a longitudinal axis (indicated by dashed line 26 in FIG. 1) between a rear end 28 and an opposing front end 30. Laterally, washing bay 22 extends between a left, or driver's side, 32 and an opposing right side 34. While not shown, washing bay 22 also has a lateral axis extending between left side 32 and right side 34 of washing bay 22, perpendicular to longitudinal axis 26.

A side track 36 extends along left side 32 of washing bay 22. While side track 36 is shown in the drawings as extending along left side 32, side track 36 could alternatively be installed to extend along right side 34 of washing bay 22. In either case, side track 36 need be installed along only one side of washing bay 22. Side track 36 includes an upper horizontal rail 38, a lower horizontal rail 40, and two or more vertical supporting posts 42 and 44 for supporting rails 38 and 40 above the ground. Upper rail 38 and lower rail 40 each preferably have a square, or rectangular, cross-section. As shown in FIGS. 1–3, post 42 includes a base 46 which is preferably secured (as by bolts) to the floor of washing bay 22. Preferably, post 42 is secured near its upper end by extension member 48 to a wall 50 that encloses the left side of washing bay 22. Side track 36 extends parallel to longitudinal axis 26 of washing bay 22 and extends from rear end 28 to front end 30 of washing bay 22.

Still referring to FIGS. 1–3, a gantry 52 is movably supported upon side track 36 for reciprocal forward and backward movement along left side 32 of washing bay 22, generally parallel to longitudinal axis 26. Gantry 52 extends between lower end 54 and opposing upper end 56; as shown in FIGS. 2 and 3, upper end 56 of gantry 52 extends in height above the upper surface of vehicle 24. Gantry 52 is supported upon side track 36 by a series of roller wheels that engage upper rail 38 and lower rail 40. A first such roller wheel 58 is mounted for rotation about a vertical axis and extends downwardly from bracket 60. Roller wheel 58 engages the vertical surface of upper rail 38 that faces wall 50. A second roller wheel 62 is secured to gantry 52 for rotation about a horizontal axis of rotation, and the lowermost surface of roller wheel 62 rolls upon the uppermost horizontal face 39 of upper rail 38, both to help bear the weight of gantry 52 and to help propel gantry 52 along side track 36 in a manner described in greater detail below. A third roller wheel 64 is mounted at the lower end 54 of gantry 52 for rotation about a vertical axis for engaging the inner face 41 of lower rail 40. In this manner, roller wheels 58, 62 and 64 support the weight of gantry 52 upon side track 36 while permitting gantry 52 to be propelled back and forth therealong between the rear and front ends, 28 and 30, respectively, of washing bay 22.

Figure 4:
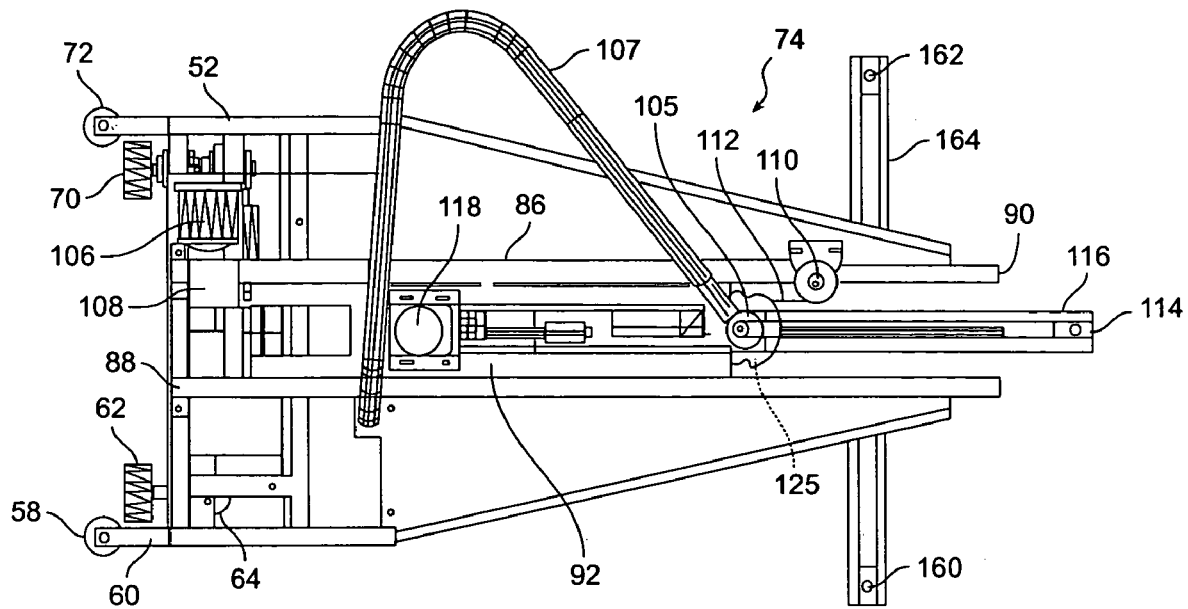
FIG. 4 is a top view of the gantry, lateral support, and rolling carriage of the washing apparatus shown in FIGS. 1–3.
Figure 19:
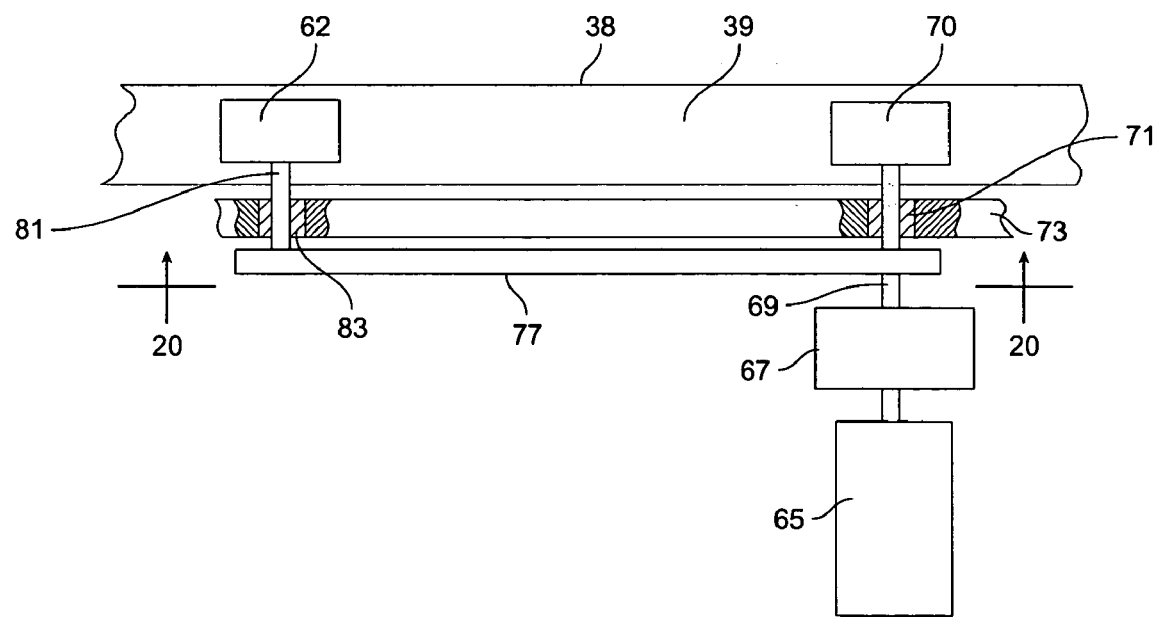
FIG. 19 is a top view of the gantry motor, reduction gear box, and gantry drive wheels used to propel the gantry along the sidetrack.
Figure 20:
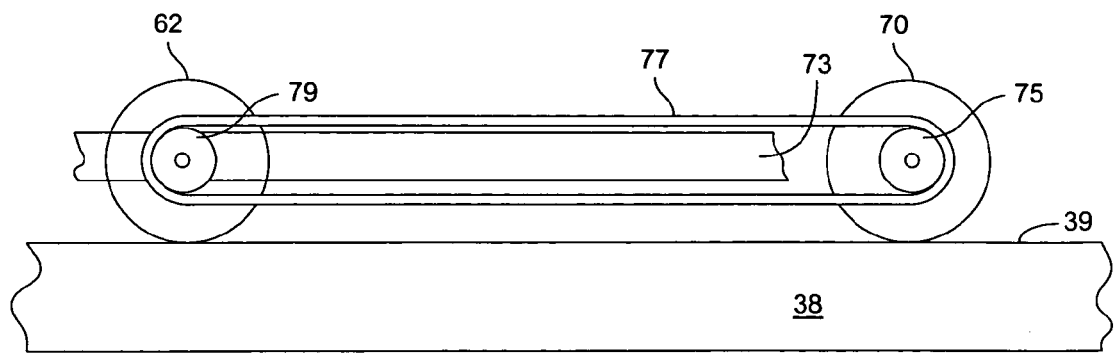
FIG. 20 is a sectional view of components shown in FIG. 19, taken through the plane designated by section lines 20—20 in FIG. 19.

Referring briefly to FIGS. 19 and 20, in order to selectively move gantry 52 back and forth along side track 36, a gantry motor 65 is mounted upon gantry 52 and is coupled to reduction gear box 67. The output shaft 69 of reduction gear box 67 passes through bearing 71 of gantry frame member 73 for rotating drive wheel 70. Drive wheel 70 rests upon upper surface 39 of upper rail 38 of side track 36. A toothed pulley 75 is secured to output shaft 69 for rotating toothed drive belt 77, and toothed drive belt 77 also engages toothed pulley 79. Those skilled in the art will appreciate that a drive chain may be substituted for drive belt 77, and that toothed sprocket gears could be substituted for toothed pulleys 75 and 79. Toothed pulley 79 is coupled by shaft 81, which passes through bearing 83, to drive wheel 62. Motor 65 can be rotated in either direction to propel gantry 52 forward or rearward. Drive wheels 62 and 70, which are also shown in FIG. 4, are preferably made of rubber or plastic to increase traction with upper rail 38. Also shown in FIG. 4 is a roller wheel 72, corresponding to roller wheel 58, for engaging the rear face of upper rail 38.

Secured to, and extending from, upper end 56 of gantry 52 in cantilevered fashion is a telescoping lateral support arm, designated generally by reference numeral 74, which extends above, and at least partially across, washing bay 22. Lateral support arm is used to rotatably support a generally inverted L-shaped washing arm, or spray bar, 76. Spray bar 76 includes a generally horizontal upper portion 78 and a generally vertical lower portion 80. Spray bar 76 is tubular and includes an inner hollow channel which can be filled with water and various washing fluids. Both vertical portion 80 and horizontal portion 78 have spray nozzles, such as 82 and 84, respectively, for directing cleaning fluid at vertical and horizontal surfaces, respectively, of vehicle 24.

Referring again to FIG. 1, a cleaning fluid pump 68 and associated pump motor 66 are supported by gantry 52 for movement therewith. Pump motor 66 powers cleaning fluid pump 68 by a connecting drive belt. Cleaning fluid pump 68 may be used to force cleaning fluids under pressure into spray bar 76 for forcing such cleaning fluid out of spray bar 76 nozzles (e.g., 82 and 84) onto the exposed surfaces of vehicle 24. In addition, gantry 52 may be used to convey cleaning fluid reservoirs, such as those labeled 67 and 69, which can selectively serve as the source of cleaning fluid to be pumped by the aforementioned cleaning fluid pump. Alternatively, the cleaning fluid pumps and cleaning fluid reservoirs can be kept at a fixed location, e.g., an equipment room behind wall 50, and one or more pressurized supply hoses may extend from such equipment room to gantry 52 for supplying appropriate cleaning fluids under pressure. Those skilled in the art will recognize that, while not specifically shown, certain supply lines need to extend to gantry 52, including an electrical power line and a cold water supply line. Preferably, a pressurized compressed air line, and heated-water re-circulation lines also extend to gantry 52.

Figure 5:
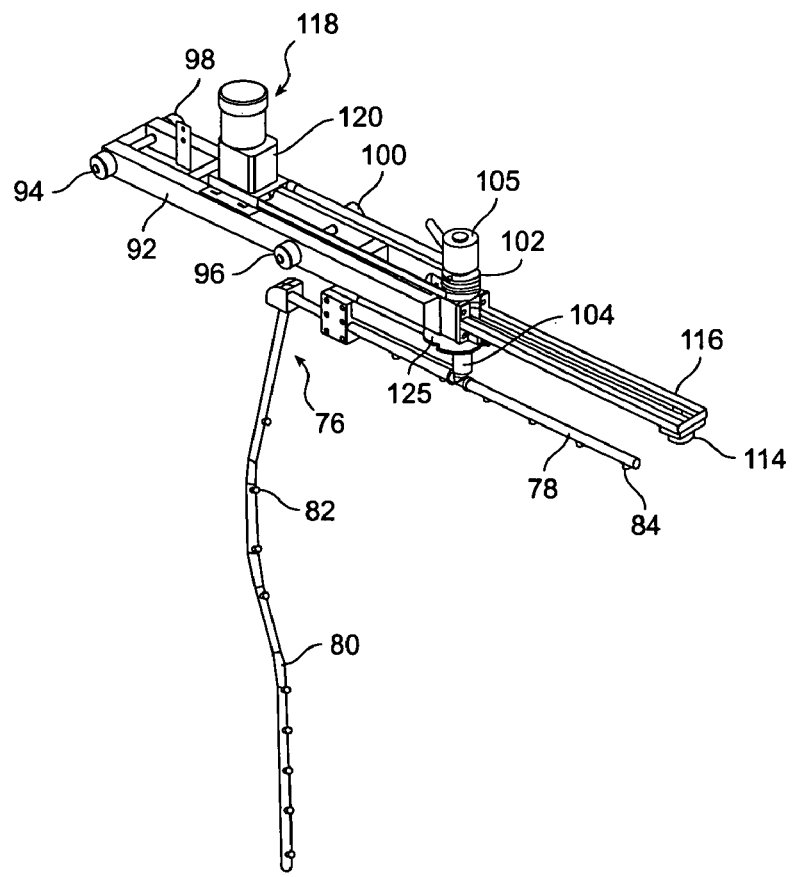
FIG. 5 is a perspective view of the rolling carriage and spray bar of FIGS. 1–4.

Lateral support arm 74 includes a fixed support channel 86 having a first end 88 secured to upper end 56 of gantry 52 and an opposing second free end 90. A rolling carriage 92, shown best in FIG. 5, including roller wheels 94, 96, 98 and 100, fits within and rolls along support channel 86 for side-to-side movement therealong. Accordingly, carriage 92 can be alternately retracted within, or extended from, channel 86. The outer end 102 of carriage 92 houses a bearing that receives a hollow, vertical drive shaft 104 connected to, and in fluid communication with, spray bar 76. Vertical drive shaft 104 preferably joins horizontal portion 78 of spray bar 76 at approximately the midpoint of horizontal portion 78. Thus, spray bar 76 is rotatably supported about a vertical axis of rotation relative to carriage 92 of lateral support arm 74. A fluid-tight union 105 is coupled to the upper end of hollow vertical drive shaft 104 and is coupled to supply hose 107 for communicating cleaning fluids to spray bar 76. As will be explained in greater detail below, spray bar 76 can be selectively rotated to sweep the spray nozzles around corners of vehicle 24. Gantry 52, gantry motor 65, and lateral support arm 74 can be collectively regarded as a movable member for supporting spray bar 76 above washing bay 22, adapted to move generally between rear end 28 and front end 30 of washing bay 22 for positioning spray bar 76 at different points within washing bay 22.

A carriage motor 106 is supported upon fixed end 88 of channel 86 for selectively moving carriage 92 along channel 86 between retracted and extended positions. The output shaft of carriage motor 106 is coupled to a right angle reduction gear box 108. A downwardly-directed output shaft of gear box 108 rotates a drive gear that extends in a substantially horizontal plane. A toothed rubber drive belt 112 extends between the aforementioned drive gear and idler gear 110 which is mounted for rotation about a vertical axis in a horizontal plane inset approximately one foot from free end 90 of channel 86. Thus, rotation of carriage motor 106 moves drive belt 112 around idler gear 110. Drive belt 112 is secured at one point to carriage 92. As idler gear 110 and drive belt 112 rotate in a clockwise direction, carriage 92 is forced to retract within channel 86. In contrast, when idler gear 110 and drive belt 112 rotate in the opposite, counterclockwise direction, carriage 92 is forced to extend partially out of channel 86.

FIG. 2 shows spray bar 76 extending adjacent the driver's side of vehicle 24, with carriage 92 retracted within channel 86, while FIG. 3 shows spray bar 76 rotated 180 degrees from the position shown in FIG. 2, and with carriage 92 extended by a sufficient amount to maintain spray bar 76 slightly spaced from the right side (passenger's side of vehicle 24). As mentioned above, it is desired that the present invention be capable of being used with vehicles of varying widths. This means that washing apparatus 20 must include some method of sensing the width of vehicle 24. To this end, a vehicle width sensor element 114 is mounted upon an extension bracket 116 that extends from outer end 102 of carriage 92.

Sensor element 114 may be of the type which emits sound waves, and which detects reflections of the emitted sound waves, to detect relative proximity of vehicle 24 thereto. Before vehicle 24 pulls into washing bay 22, sensor 114 is positioned approximately seven feet above the floor of the washing bay. However, after vehicle 24 pulls into washing bay 22, the distance between sensor 114 and the upper surfaces of vehicle 24 decreases to perhaps three feet or less. Sensor 114 moves in unison with carriage 92, from side-to-side, and senses whether or not sensor 114 is above vehicle 24 or beyond vehicle 24. At a certain point in time during such side-to-side travel, sensor 114 will note a sudden change in the distance over which the emitted sound waves are reflected. This transition is used to effectively detect the location of the right side (or passenger side) of vehicle 24. This detection step can be performed during an initial "pre-soak" cycle when a grime loosening foam is sprayed over the surfaces of vehicle 24 at relatively low pressure. During such pre-soak cycle, spray bar 76 need not be maintained proximate to the right side of the vehicle, and carriage 92 may be fully extended during such pre-soak cycle to clear the right side of vehicle 24. As spray bar 76 clears either the front right corner, or rear right corner of vehicle 24 (in a manner to be explained below), sensor 114 will note the transition in reflection distance, and washing apparatus 20 thereby takes note of the actual width of vehicle 24. This actual vehicle width is then used to control the position of carriage 92, and hence spray bar 76, during subsequent passes along the right side of vehicle 24. Incidentally, a limit sensor 93 (see FIG. 1) may also be located along channel 86 near the free end thereof for sensing that carriage 92 has been moved to a fully extended position. This limit sensor may be in the form of a metal proximity sensor for detecting the presence of a block of metal adjacent such sensor. Such block of metal can be secured to carriage 92 at a location whereby such block of metal lies adjacent the metal proximity sensor when carriage 92 is essentially fully extended. In this manner, the metal proximity sensor may be used to disable the carriage motor from attempting to further extend carriage 92 out of channel 86. Such a limit sensor provides a fail safe mechanism in the event that, for some reason, sensor 114 never "finds" the right side of vehicle 24. Likewise, another limit sensor 95 (see FIG. 1) is secured near the fixed end of channel 86 for detecting that carriage 92 is fully retracted.

While FIGS. 2 and 3 show spray bar 76 at its zero degrees, and 180 degrees, orientations, respectively, spray bar 76 may also be rotated to a 90 degree orientation directed toward front end 30 of washing bay 22 for washing the front end of vehicle 24, as well as to a 270 degree orientation directed toward rear end 28 of washing bay 22 for washing the rear end of vehicle 24. Rotation of spray bar 76 is controlled by wash arm motor 118 supported by, and secured to, carriage 92 for lateral movement therewith. The output shaft of wash arm motor 118 is coupled to gear reduction box 120 which in turn rotates a drive gear (not visible) for rotating a drive belt 122 (see FIG. 6). Drive belt 122 extends to, and wraps about a driven gear 124 that is coupled with drive shaft 104 of spray bar 76. Thus, as wash arm motor 118 rotates, drive belt 122 also rotates and causes driven gear 124, drive shaft 104, and spray bar 76 to rotate with it.

Figure 6:
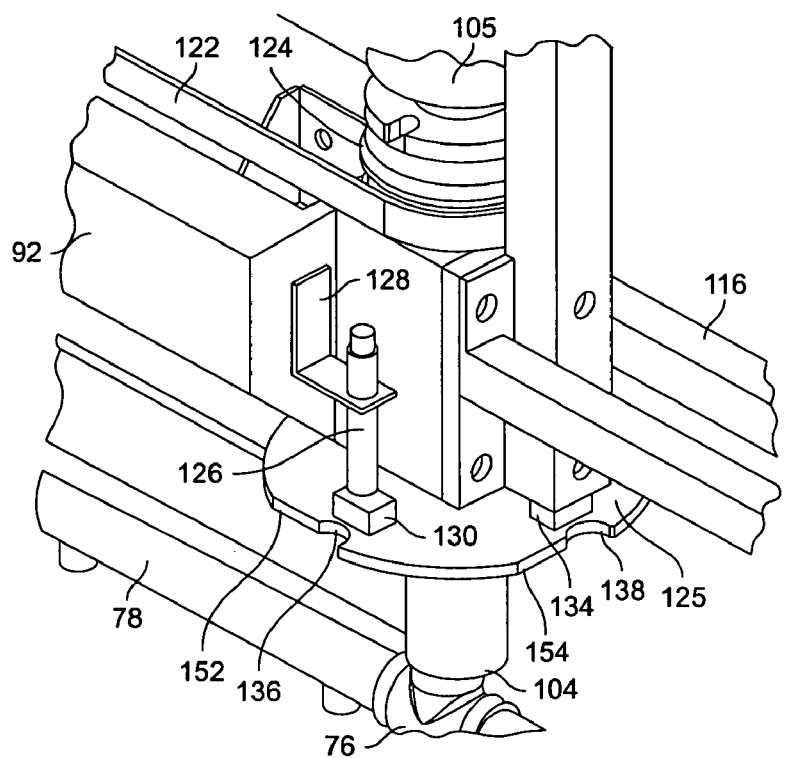
FIG. 6 is a partial perspective view of the end of the rolling carriage that rotatably supports the spray bar.

Wash arm motor 118 causes spray arm 76 to rotate in 90-degree steps for rounding each corner of vehicle 24. To assist wash arm motor 118 in properly indexing spray bar 76 at one of its four orientations (i.e., zero degrees, 90 degrees, 180 degrees, or 270 degrees), a cam plate, engagement roller, and proximity sensor are used. Cam plate 125 is secured to spray bar drive shaft 104 just below the bearing housed in the outer end of carriage 92. Cam plate 125 is planar, generally circular, and extends essentially in a horizontal plane perpendicular to drive shaft 104. A proximity sensor, or cam position sensor, 126 is secured to outer end 102 of carriage 92 by bracket 128 and is directed toward cam plate 125. Four blocks of metal, including those shown as 130 and 134 in FIG. 6, are secured to the upper surface of cam plate 125. As cam plate 125 rotates, proximity sensor 126 detects whether or not one of the blocks of metal is registered therewith. When proximity sensor 126 detects that cam plate 125, and hence spray bar 76, has rotated by 90 degrees to the next indexed orientation, wash arm motor 118 is immediately turned off. Thus, cam position sensor 126 serves to sense the relative rotational position of cam 125.

Figure 7:
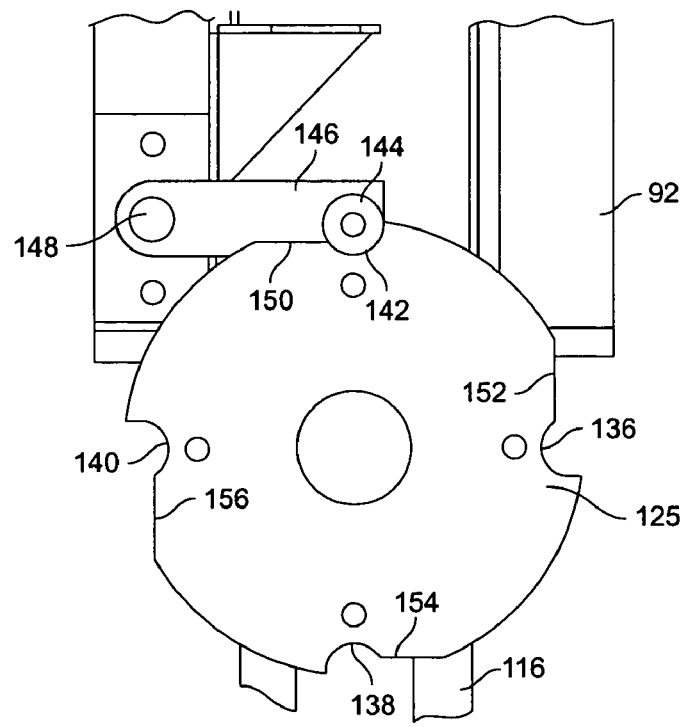
FIG. 7 is a bottom view, looking up at a cam plate shown in FIG. 6.

In addition, and referring primarily to FIG. 7, the outer periphery of cam plate 125 has a series of four grooves, or detent points, 136, 138, 140, and 142, formed respectively at ninety degree intervals. An engaging member, preferably in the form of a roller 144 mounted on the end of a pawl bar 146, bears against the cam plate outer periphery, and engages one of the detent points, 136, 138, 140, or 142, for indexing spray bar 76 at one of the four desired orientations. Pawl bar 146 pivots about pivot point 148, and a bias spring (not shown) urges pawl arm 146 and roller 144 against the outer periphery of cam plate 125. As shown in FIG. 6, detent points 136 and 138 on the outer periphery of cam plate 125 are aligned with metal blocks 130 and 134, respectively, so that the wash arm motor stops rotating just as roller 144 engages one of the detent points.

Cam plate 125 rotates only in the counter-clockwise direction relative to FIG. 6 (i.e., only in the clockwise direction relative to the bottom view shown in FIG. 7).

Roller 144 will not allow spray bar 76 to rotate in one direction, but roller 144 can easily be dislodged from detent point 142 onto flattened region 150 when wash arm motor 118 is activated once more upon reaching the next corner of vehicle 24. Likewise, the outer periphery of cam plate 125 has flattened regions 152, 154, and 156 adjacent detent grooves 136, 138, and 140, respectively. In each case, roller 144 may be displaced from each detent groove onto the adjoining flat for allowing spray bar 76 to rotate when the wash arm motor is re-activated to make another quarter turn. Cam plate 125 and roller 144 provide a further advantage; if spray bar 76 should contact an item projecting from vehicle 24, for example, side view mirror 158 (see FIGS. 2 and 3) while passing along either the left side of vehicle 24 or the right side of vehicle 24, roller 144 and cam plate 125 prevent spray bar 76 from being rotated toward, and forced against, the surface of vehicle 24. Instead, the vertical portion 80 of spray arm 76 yields to such force via a coupling joint described in greater detail below.

The manner in which vehicle width sensor 114 is used to detect the relative position of the right side of vehicle 24, and hence to control movement of carriage 92, has already been described above. Likewise, it is also necessary to sense the relative positions of the front end and rear end of vehicle 24 to control forward and backward movement of gantry 52. One method of doing so is to position a rear end sensor element 160, and a forward end sensor element 162, on opposing ends of bracket 164, as shown in FIG. 4. Sensors 160 and 162 are thereby mounted for reciprocal forward and rearward movement along with gantry 52 to sense that gantry 52 is disposed either proximate the rear end of vehicle 24, or proximate the front end of vehicle 24, respectively. Sensors 160 and 162 may be of the type previously described in conjunction with vehicle width sensor 114, wherein sound is emitted, and reflected sound waves are sensed to detect the relative distance between the sensor and the reflecting surface. Alternatively, sensors 114, 160 and 162 may be optical photo sensors that use reflected light waves to detect the right side, rear end, and front end of vehicle 24.

Figure 21:
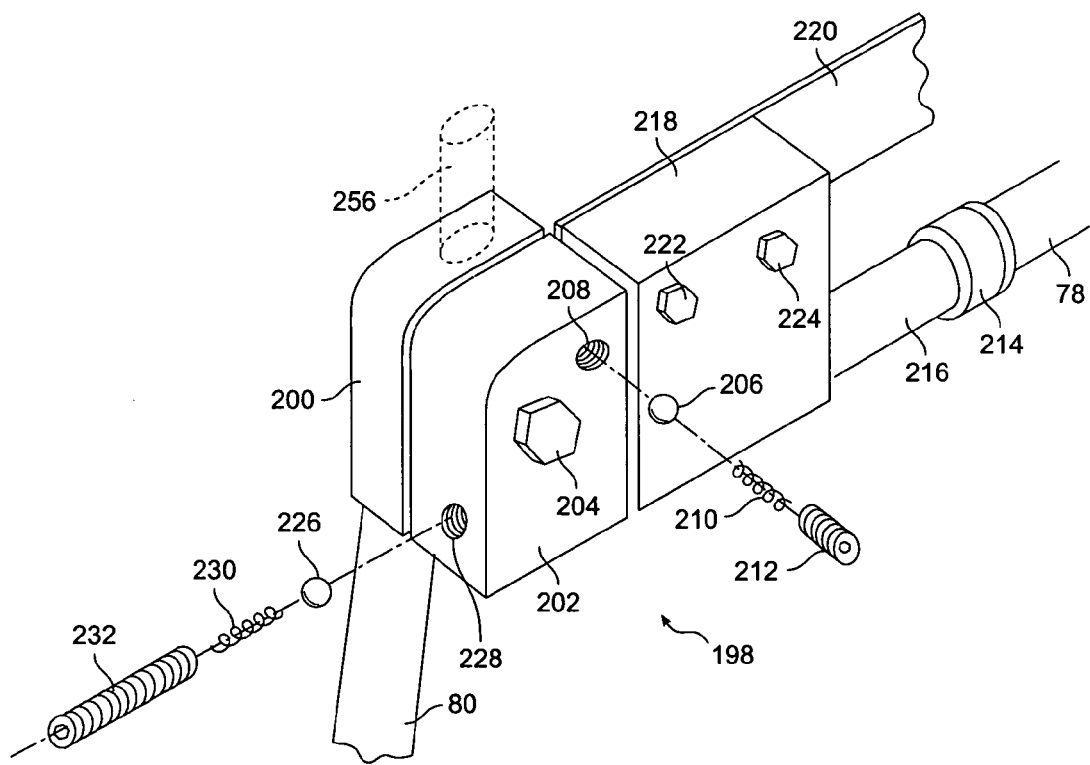
FIG. 21 is a partial perspective view of a coupling joint for coupling a vertical portion of the spray bar to the horizontal portion thereof.

As mentioned above, spray bar 76 could potentially damage the surface of vehicle 24 if it were to contact vehicle 24. One instance in which such damage should be avoided occurs when spray bar 76 is directed either forwardly (as when cleaning the front end of vehicle 24) or rearwardly (as when cleaning the rear end of vehicle 24), i.e., parallel to the longitudinal axis of washing bay 22. Such a situation might arise, for example, if the driver of the vehicle were to inadvertently start to pull forward out of washing bay 22 before spray bar 76 had finished its last pass across the front end of vehicle 24. Referring to FIG. 21, coupling joint 198 includes a first block 200 from which vertical portion 80 of spray bar 76 extends. A second mating block 202 is secured against first block 200 by bolt 204. Bolt 204 retains adjoining faces of blocks 200 and 202 in contact with one another while permitting relative rotational movement between such adjoining faces about the axis of bolt 204. While not visible in FIG. 21, block 200 and block 204 each include internal fluid passageways that communicate with each other at the adjoining faces of blocks 200 and 202; an O-ring seal (not shown) disposed between such faces maintains a fluid tight coupling therebetween while permitting the aforementioned relative rotation between blocks 200 and 202. The fluid passageway formed within block 200 communicates with the upper end of vertical portion 80 of spray bar 76. Likewise, the fluid passageway formed within block 202 is in fluid communication with horizontal portion 78 of spray bar 76.

Under normal conditions, blocks 200 and 202 have the relative rotational configuration shown in FIG. 21, and vertical portion 80 of spray bar 76 extends generally vertically downward from coupling joint 198. Blocks 200 and 202 are maintained in such position by a ball 206 that is inserted into bore 208 for engaging a detent (not shown) formed in the inner face of block 200. Ball 206 is urged toward such detent by biasing spring 210, which is secured within bore 208 by set screw 212. However, should vertical portion 80 of spray bar 76 contact vehicle 24 during those instances when spray bar 76 extends parallel to the longitudinal axis of washing bay 22, then ball 206 breaks away from the aforementioned detent, and block 200 is allowed to rotate, thereby permitting vertical portion 80 of spray bar 76 to yield and avoid significant damage to either vehicle 24 or spray bar 76. In such cases, after vehicle 24 is removed from washing bay 22, the operator of the washing facility need merely push vertical portion 80 of spray bar 76 back toward its original position, and ball 206 will again register with the aforementioned detent.

It was also noted above that vertical portion 80 of spray bar 76 may sometimes get caught on projections extending from the sides of vehicle 24, like oversized side view mirrors, for example, during passage of spray bar 76 along the driver's side or passenger's side of vehicle 24. It has already been noted that cam plate 125 prevents the spray bar 76 from rotating back toward the surface of vehicle 24 in such cases, but damage to such side view mirrors, and damage to spray bar 76 itself, must also be avoided, if possible. Still referring to FIG. 21, horizontal portion 78 of spray bar 76 is coupled by a rotatable swivel 214 to short extender tube 216. Extender tube 216 extends through a third block 218 and terminates at block 202 for providing cleaning fluid to the passageway formed within block 202. Third block 218 is bolted to a support bracket 220 by bolts 222 and 224. The opposing end of support bracket 220 is welded to spray bar drive shaft 104 for rotation therewith.

Extender tube 216 is rotatably supported within third block 218 about the longitudinal axis of extender tube 216. Accordingly, swivel 214 allows for rotation of extender tube 216, blocks 202, 200, and vertical portion 80 of spray bar 76 as a unit about swivel 214. Under ordinary conditions, block 202 and block 218 have the relative rotational configuration shown in FIG. 21. Block 202 is maintained in such relative rotational configuration by a ball 226 which engages a detent (not visible) formed in a face of block 218 that adjoins block 202. Ball 226 extends within bore 228 of block 202 and is urged into such detent by biasing spring 230. Ball 226 and spring 230 are retained within bore 228 by an elongated set screw 232. However, should vertical portion 80 of spray bar 76 contact a projection extending from a side of vehicle 24 during those instances when spray bar 76 extends perpendicular to the longitudinal axis of washing bay 22, then ball 226 breaks away from the aforementioned detent, and blocks 200 and 202 are allowed to rotate about the longitudinal axis of swivel 214, thereby permitting vertical portion 80 of spray bar 76 to yield and avoid significant damage to either the projection extending from vehicle 24 or to spray bar 76 itself. In such cases, after vehicle 24 is removed from washing bay 22, the operator of the washing facility need merely rotate vertical portion 80 of spray bar 76 back toward its original vertical position, and ball 226 will again register with the aforementioned detent formed in the adjoining face of block 218.

Figure 22:
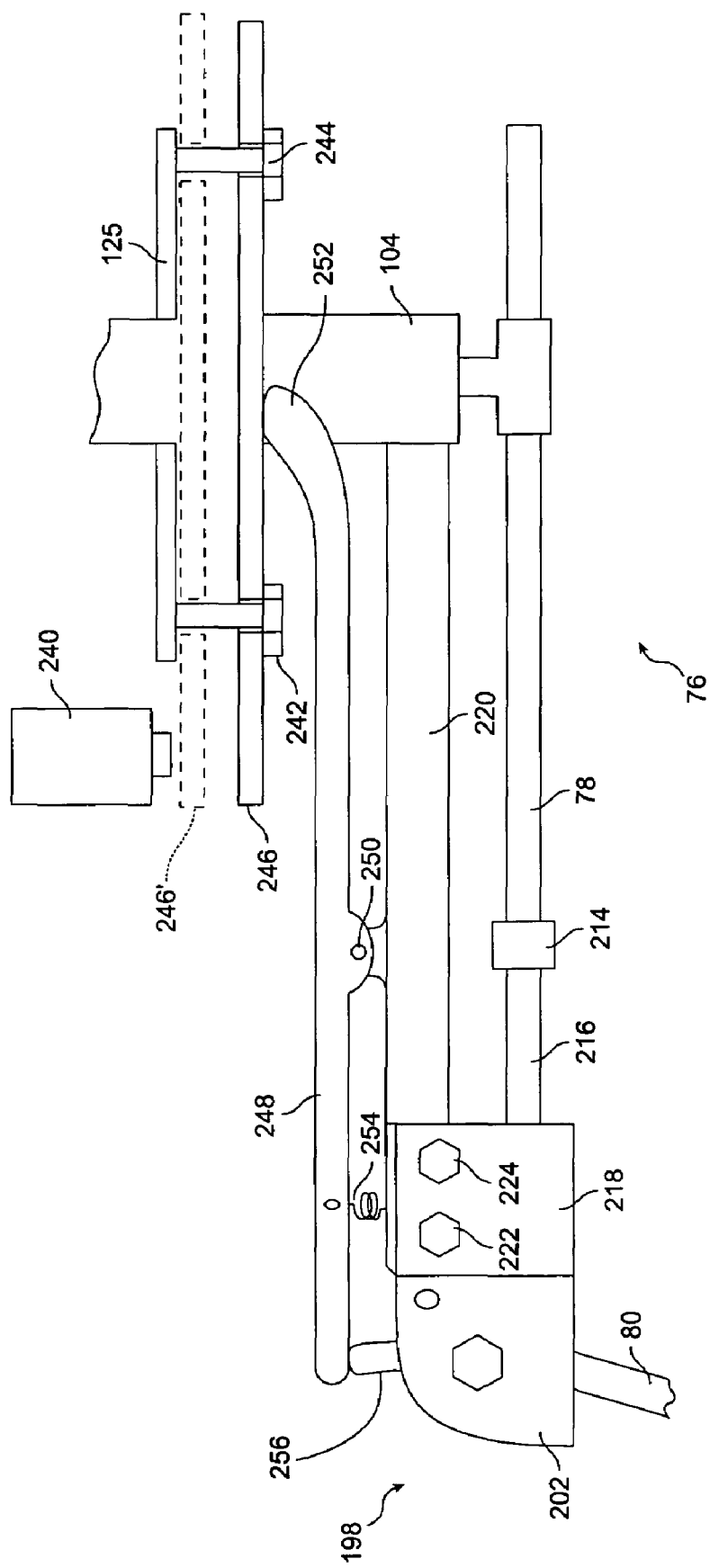
FIG. 22 is a modified version of the washing apparatus including a sensor for detecting that the spray bar has unexpectedly contacted a portion of the vehicle to halt further cleaning operations.

In a preferred embodiment of the present invention, shown in FIG. 22, an electrical control signal is generated to shut down washing apparatus 20 in the event that spray bar 76 strikes either vehicle 24 or a projection extending from vehicle 24. Within FIG. 22, components that are in common with those described above are identified by that same reference numerals. Thus, spray bar 76, coupling joint 198, drive shaft 104, and cam plate 125 all function in the same manner as already described. However, an additional proximity sensor 240 is secured to the free end of carriage 92 for sensing whether or not vertical portion 80 of spray bar 76 has been forced away from its usual orientation. A series of shoulder bolts 242 and 244 depend downwardly from cam plate 125. A circular switch plate 246 has oversized apertures formed therein at positions that correspond to the locations of shoulder bolts 242 and 244, and such apertures receive the shafts of shoulder bolts 242 and 244. Thus, switch plate 246 is disposed below cam plate 125 and rotates therewith along with drive shaft 104. Normally, switch plate 246 rests upon the heads of shoulder bolts 242 and 244, as indicated by the solid outline of switch plate 246 in FIG. 22. However, switch plate 246 may also be elevated to the dashed outline position 246' directly adjacent to cam plate 125, where its presence can be detected by proximity sensor 240.

Still referring to FIG. 22, a rocker arm 248 is pivotally mounted above support bracket 220 by a pivot pin 250. The innermost end of rocket arm 248 is divided into two oppositely-directed forked lifting arms 252, only one of which is visible in FIG. 22. Forked lifting arms 252 extend around opposing sides of drive shaft 104 and are adapted to engage the underside of switch plate 246. A biasing spring 254 is coupled between rocker arm 248 and block 218. Biasing spring normally acts to pull the outer (leftmost, in FIG. 22) end of rocker arm 248 downward, as would cause lifting arms 252 to raise switch plate 246 to its elevated position 246'. A stub arm 256 is secured to block 200 (see FIG. 21) for engaging the underside of outer (leftmost, in FIG. 22) end of rocker arm 248, thereby preventing biasing spring 254 from rotating rocker arm 248 away from its starting position shown in FIG. 22. However, if stub arm 256 rotates away from its original upward orientation, either because block 200 rotates relative to block 202, or because blocks 200 and 202 rotate as a unit relative to third block 218, then biasing spring 254 causes rocker arm 248 to rotate counter-clockwise (relative to FIG. 22), allowing lifting arms 252 to raise switch plate 246 to the elevated position 246'. Proximity sensor 240 senses that switch plate 246 has been raised and responds by generating a control signal to disable any further washing operations until the problem is resolved, and coupling joint 198 is reset.

Figure 8:
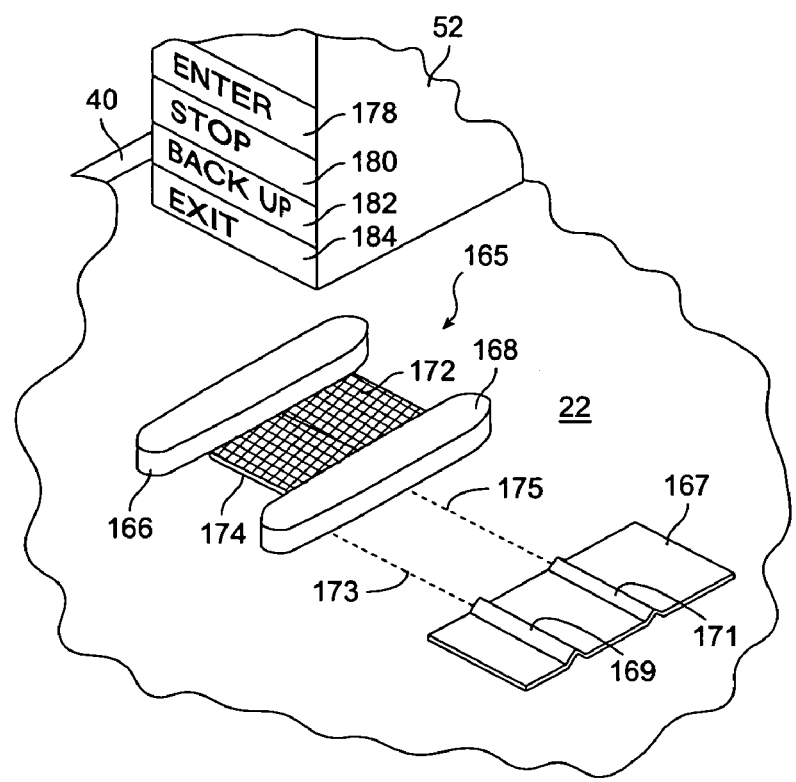
FIG. 8 is perspective view of a vehicle wheel indexing system used to help ensure that the vehicle to be washed is properly positioned within the washing bay before a washing cycle begins.

The present invention also incorporates an improved mechanism for ensuring that vehicle 24 is properly positioned within washing bay 22 before gantry 52 and spray bar 76 are operated. Referring to FIG. 8, a wheel guide 165 is disposed on the floor of washing bay 22. Wheel guide 165 is adapted to receive the front, driver's side wheel of vehicle 24. Wheel guide 165 includes opposing side walls 166 and 168 for guiding the left front tire of vehicle 24 to a known position relative to the lateral axis of washing bay 22. Lying between side walls 166 and 168 is a two-segment pressure sensitive pad including first segment 174 and second segment 172. This pressure sensitive pad may be of the type commercially available from London Mat Industries of London, Ontario, Canada, under Model CW547. First segment 174 is pressure sensitive and functions like a pressure sensor or treadle switch. First segment 174 is responsive to the weight of vehicle 24 for sensing that the left front tire is properly positioned over first segment 174. First segment 174 corresponds to a predetermined index point relative to the longitudinal axis 26 of washing bay 22. First segment 174 creates a first signal, which might simply be the closing of an electrical circuit, indicating that the left front tire is bearing down upon first segment 174. Second segment 172 is also pressure sensitive, and also functions like a pressure sensor or treadle switch. Second segment 172 lies beyond first segment 174 (relative to the entry port of washing bay 22), and senses that the left front tire of vehicle 24 is positioned over second segment 172, and hence beyond first segment 174. Second segment 172 creates a second signal, which may again simply be the closing of an electrical circuit, indicating that the left front tire is bearing down upon second segment 172.

To help instruct the driver of vehicle 24 when using washing bay 22, illuminated warning lights may be positioned upon the front face of gantry 52 directed toward the driver of vehicle 24. Before vehicle 24 is pulled into washing bay 22, a first sign 178 is illuminated for instructing the driver to enter washing bay 22. Once the left front wheel rests upon first segment 174 of the pressure sensitive pad, a second sign 180 is illuminated to instruct the driver to stop further forward movement. If the driver has pulled too far forward, causing the left front tire to bear upon second segment 172, a third sign 182 is illuminated to warn the driver to back-up. Finally, when all washing operations are complete, exit sign 184 is illuminated to instruct the driver to drive out of washing bay 22.

Still referring to FIG. 8, a ribbed plate 167 is also installed on the floor of washing bay 22 to receive the right front wheel of vehicle 24. As indicated by dashed line 173, first rib 169 is aligned with the front of first pressure-sensitive segment 174, while second rib 171 is aligned with the border between first segment 174 and second segment 172. Usually, a driver can feel the right front wheel pass over rib 169 and rest against rib 171 to assist the driver in positioning the left front wheel over first segment 174. While ribs 169 and 171 are shown in FIG. 8 as being disposed for receiving the right front tire of vehicle 24, such ribs could, if desired, be incorporated within wheel guide 165 itself.

Figure 9:
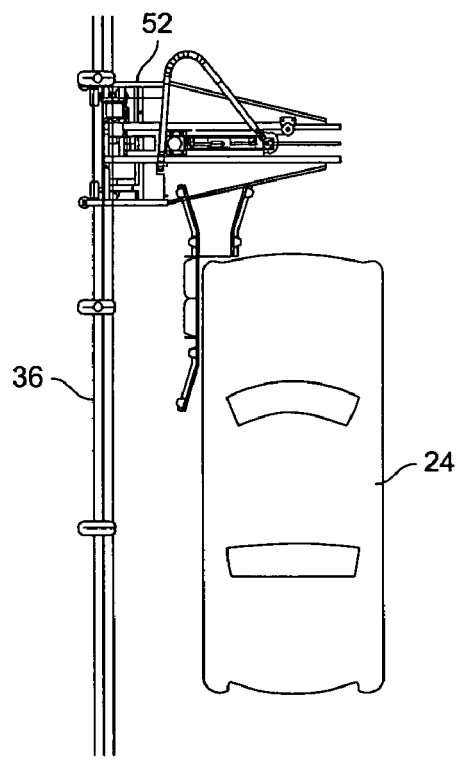
FIGS. 9–18 are sequential top views of the washing apparatus as it makes one complete washing cycle around a vehicle to be washed.
Figure 10:
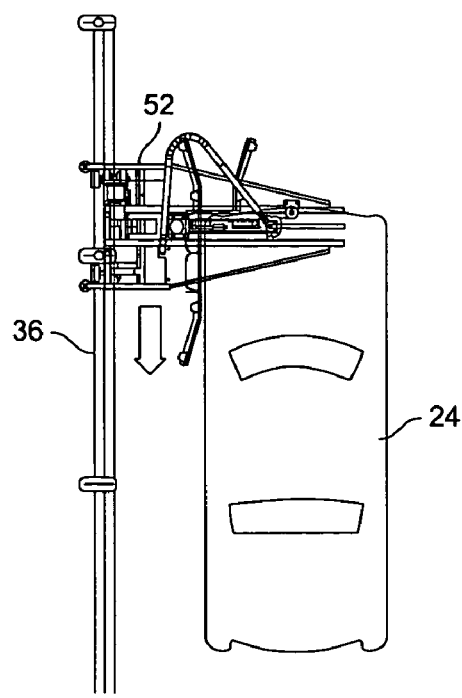
Figure 11:
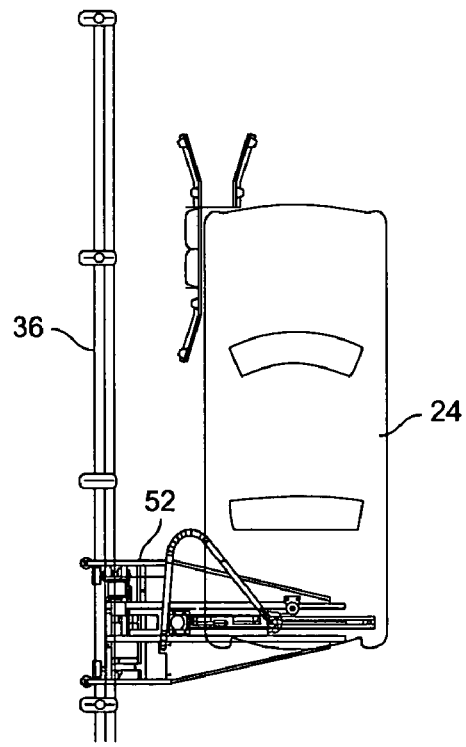
Figure 12:
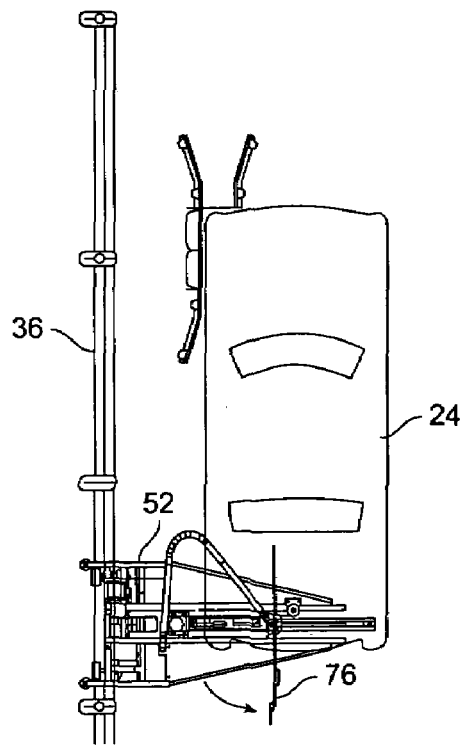
Figure 13:
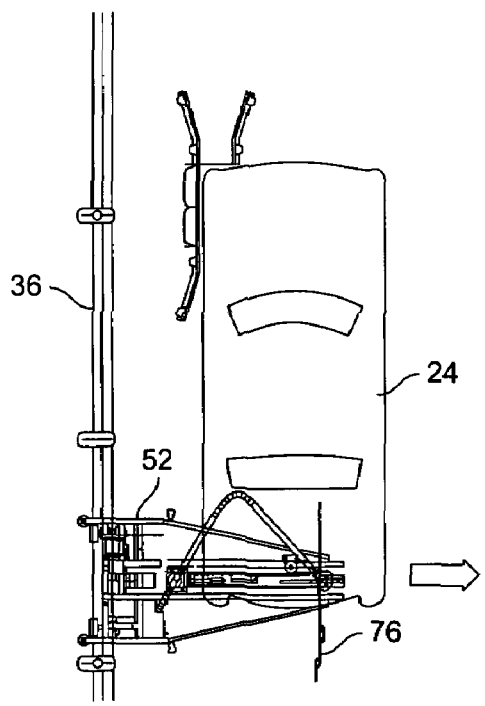

The operation of washing apparatus 20 during a typical washing cycle will now be explained in conjunction with FIGS. 9–18. FIG. 9 shows the position of gantry 52 and spray bar 76 in a "Home" position when vehicle 24 first pulls into washing bay 22. Gantry 52 is fully forward, carriage 92 is retracted, and spray bar 76 is at its zero degree position (as per FIG. 2). In FIG. 10, the washing cycle begins, and gantry 52 starts to make its pass rearward; carriage 92 remains retracted, and spray bar 76 remains at its zero degree position, spraying cleaning fluid along the driver's side of vehicle 24. In FIG. 11, the rear end sensor has located the rear end of vehicle 24, and gantry 52 halts further rearward movement. In FIG. 12, wash arm motor 118 rotates spray arm 76 one-quarter turn counter-clockwise (as viewed from above) to sweep around the left rear corner of vehicle 24; carriage 92 is still fully-retracted. Then, as shown in FIG. 13, gantry 52 remains fixed, while carriage 92 is extended, as spray bar 76 sweeps across the rear end of vehicle 24 for the predetermined distance, as determined by the vehicle width sensor during the previous pre-soak cycle described above; carriage 92 stops its extension when such predetermined distance is reached. Now, as shown in FIG. 14, wash arm motor 118 is again operated to rotate spray bar 76 another quarter turn, causing spray bar 76 to sweep around the right rear corner of vehicle 24; spray arm 76 is now in its 180 degree position (as per FIG. 3).

Figure 14:
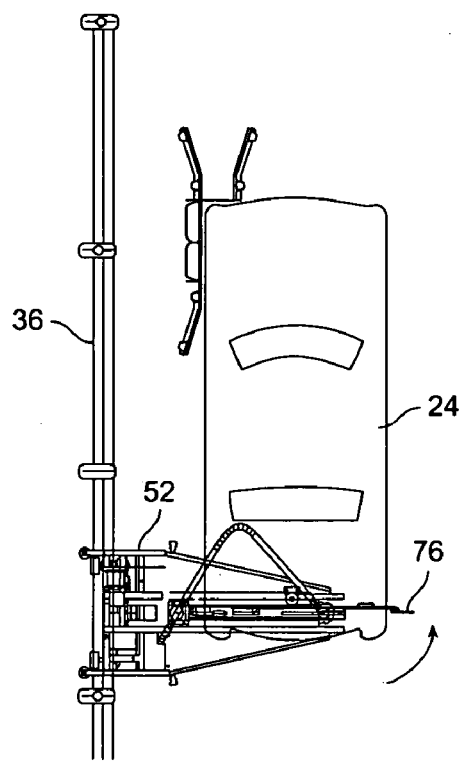
Figure 15:
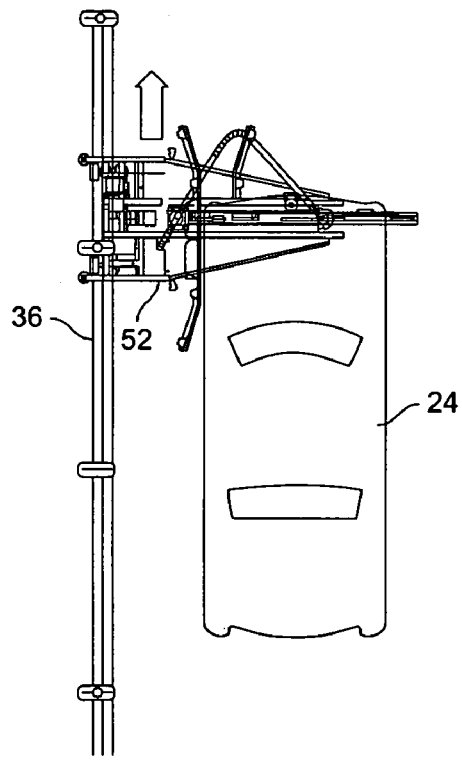
Figure 16:
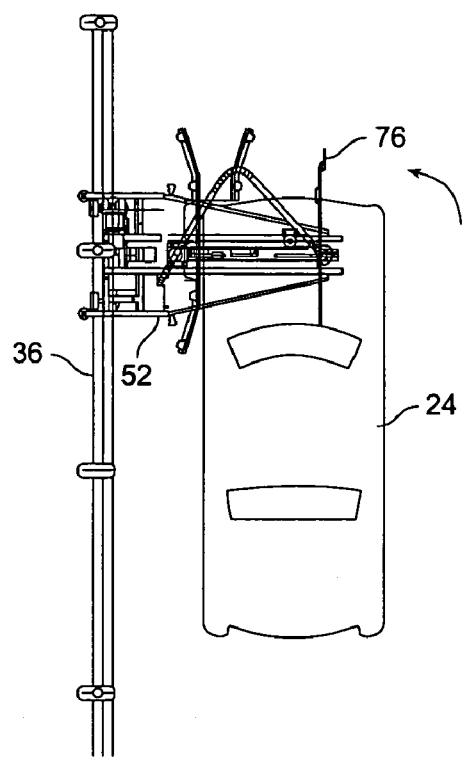
Figure 17:
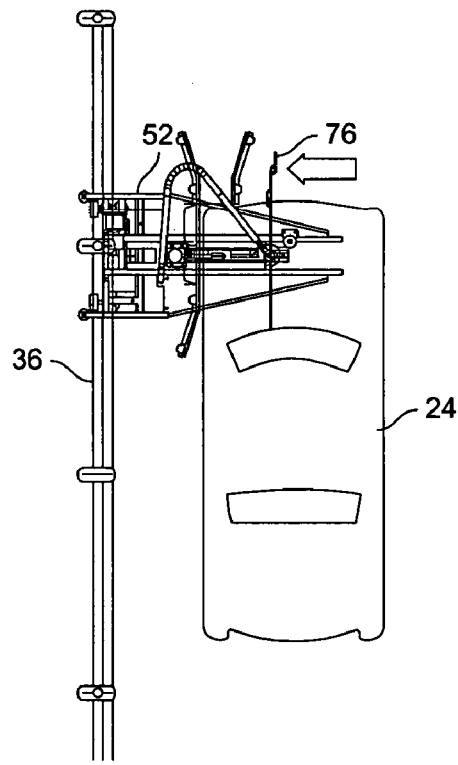
Figure 18:
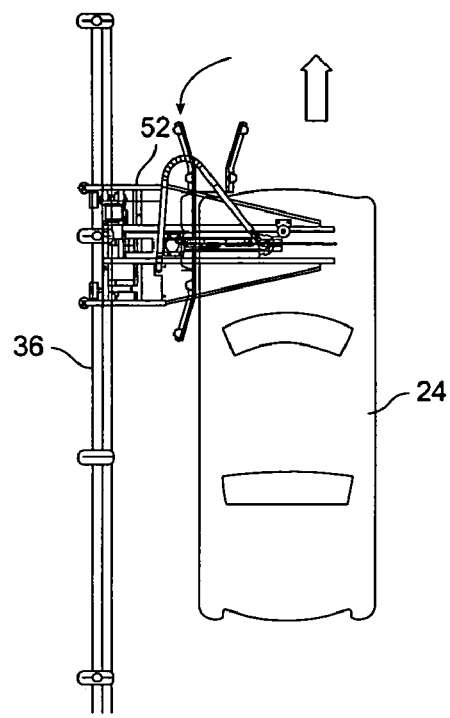

Referring now to FIG. 15, gantry 52 now moves forward, with carriage 92 fixed at the predetermined extended distance shown in FIGS. 13 and 14; spray bar 76 sweeps across the passenger side of vehicle 24. FIG. 15 shows gantry 52 stopped from further forward movement upon detecting the front end of vehicle 24. Wash arm motor 118 is then operated once more to rotate spray bar 76 another quarter turn, and spray bar 76 sweeps around the right front corner of vehicle 24; carriage 92 is still fixed at the aforementioned predetermined extended distance. Moving to FIG. 17, gantry 52 is held fixed while carriage 92 is retracted, thereby causing spray bar 76 to sweep across the front end of vehicle 24. Finally, in FIG. 18, carriage 92 is fully retracted, and wash arm motor 118 is activated once more to rotate spray bar 76 one further quarter turn clockwise to sweep around the left front corner of vehicle 24, ready for the next wash cycle.

The operations described above are preferably controlled and synchronized by an industrial control type programmable logic controller, or PLC, of the type commercially available from Western Switches and Controls, Inc. of Santa Ana, Calif. under Model No. 18-91302, which is preferably housed within gantry 52. The input signals to such PLC include vehicle width sensor 114, rear end sensor 160, front end sensor 162, full-extension limit sensor 93 that detects full extension of carriage 92, full-retraction limit sensor 95 that detects full retraction of carriage 92, the cam plate proximity sensor 126 (see FIG. 6), pressure sensitive floor mat switches 172 and 174 (see FIG. 8), switch plate proximity sensor 240 (see FIG. 22), and optionally one or more control signals from a coin-operated, or currency-operated, entry panel which control signals indicate that the user has inserted the required fee for using such machine, and which indicate the washing/waxing cycle options selected by the vehicle owner. Output control signals include control signals for operating: 1) gantry motor 65; 2) the gantry-mounted fluid pump motor 66; 3) cleaning fluid control valves (not shown) for selecting which cleaning fluid (pre-soak foam, detergent, rinse water, wax, etc.) is to be applied; 4) carriage motor 106; 5) wash arm motor 118; and 6) illuminated signs 178–184 on the front face of gantry 52 (see FIG. 8).

Those skilled in the art will now appreciate that a relatively inexpensive self-service vehicle washer has been described which effectively and reliably washes the front, rear, side, and top surfaces of a vehicle, requires relatively little floor space, and easily accommodates vehicles of varying widths and lengths while maintaining washing fluid spray nozzles relatively close to the surfaces of the vehicle being washed. The described invention allows a non-skilled user to easily determine whether the vehicle has been pulled into the washing bay by the appropriate distance to properly index the vehicle within the washing bay. It will also be noted that the described cam plate periphery, and its mating engaging roller, permit the spray bar to rotate in a single direction, thereby helping to prevent damage to the vehicle if the spray bar should contact a side view mirror or other projection extending from the side of the vehicle. Those skilled in the art will also note that the described coupling joint permits the vertical portion of the spray bar to yield should it contact the vehicle, while permitting an operator to quickly and easily reset the coupling joint to its original orientation after resolving the problem. While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

The invention claimed is:

1. A vehicle washing apparatus comprising in combination:
   a. a vehicle washing bay for accommodating a vehicle to be washed, the vehicle washing bay having a longitudinal axis extending from a rear end of the vehicle washing bay to an opposing front end of the vehicle washing bay, the vehicle washing bay also having opposing left and right sides;
   b. a side track extending along one side of the vehicle washing bay;
   c. a gantry movably supported by the side track for reciprocal forward and backward movement along one side of the vehicle washing bay, the gantry being movable in a direction generally parallel to the longitudinal axis of the vehicle washing bay, the gantry including opposing lower and upper ends;
   d. a gantry motor for selectively propelling the gantry forward and backward along the side track;
   e. a lateral support having a first end secured to the gantry in cantilevered fashion proximate the upper end of the gantry and having an opposing second free end, the lateral support extending above the vehicle washing bay and at least partially across the vehicle washing bay;
   f. a generally inverted L-shaped washing arm having a generally horizontal portion and a generally vertical portion, the generally vertical portion including spray nozzles for directing cleaning fluid at vertical surfaces of the vehicle to be washed, the washing arm being rotatably supported relative to the lateral support for rotation about a substantially vertical axis; and
   g. a wash arm motor for selectively rotating the washing arm to sweep the spray nozzles around corners of the vehicle to be washed.

2. The vehicle washing apparatus recited by claim 1 wherein:
   a. the side track includes upper and lower guide rails, and
   b. the gantry includes at least one upper rail wheel for rolling along the upper guide rail of the side track, and at least one lower rail wheel for rolling along the lower guide rail of the side track.

3. The vehicle washing apparatus recited by claim 1 including at least one cleaning fluid pump supported by the gantry for movement therewith for pumping cleaning fluid to the washing arm.

4. The vehicle washing apparatus recited by claim 3 including at least one reservoir of cleaning fluid supported by the gantry for movement therewith and coupled to the cleaning fluid pump.

5. The vehicle washing apparatus recited by claim 1 including a rear end sensor element mounted for reciprocal forward and rearward movement with the gantry to sense that the gantry is disposed proximate the rear end of the vehicle to be washed.

6. The vehicle washing apparatus recited by claim 5 including a front end sensor element mounted for reciprocal forward and rearward movement with the gantry to sense that the gantry is disposed proximate the front end of the vehicle to be washed.

7. The vehicle washing apparatus recited by claim 1 including a carriage movably supported by the lateral support for side-to-side movement therealong, the washing arm being rotatably supported by the carriage for rotation about the substantially vertical axis, and the wash arm motor being supported by the carriage.

8. The vehicle washing apparatus recited by claim 7 including a drive belt coupled between the wash arm motor and the washing arm.

9. The vehicle washing apparatus recited by claim 7 including a carriage motor for selectively moving the carnage between retracted and extended positions along the lateral support.

10. The vehicle washing apparatus recited by claim 9 including a limit sensor for sensing that the carnage has been moved to a fully retracted position, and for preventing the carnage motor from further retracting the carriage.

11. The vehicle washing apparatus recited by claim 10 wherein the generally horizontal portion of the washing arm includes a second spray nozzle for directing cleaning fluid at horizontal surfaces of the vehicle to be washed, and wherein the first spray nozzle and the second spray nozzle are located on opposite sides of the washing arm's vertical axis of rotation.

12. The vehicle washing apparatus recited by claim 7 including a vehicle width sensor element mounted for reciprocal side-to-side movement with the carriage to sense the relative width of the vehicle to be washed.

13. The vehicle washing apparatus recited by claim 12 including a limit sensor for sensing that the carriage has been moved to a fully extended position, and for preventing the carriage motor from further extending the carriage.

14. The vehicle washing apparatus recited by claim 1 wherein the generally horizontal portion of the washing arm includes at least a first spray nozzle for directing cleaning fluid at horizontal surfaces of the vehicle to be washed.

15. A vehicle washing apparatus comprising in combination:
    a. a vehicle washing bay for accommodating a vehicle to be washed;
    b. a generally inverted L-shaped washing arm having a generally horizontal portion and a generally vertical portion, the generally vertical portion including spray nozzles for directing cleaning fluid at vertical surfaces of the vehicle to be washed;
    c. a movable support member for supporting the washing arm above the vehicle washing bay, the movable support member being adapted to be moved generally between the rear end and the front end of the washing bay for positioning the washing arm at different points within the vehicle washing bay;
    d. a bearing for rotatably supporting the washing arm relative to the movable support member about a substantially vertical axis of rotation;
    e. a generally circular index plate secured to the washing arm, the circular index plate having four index positions formed respectively at ninety degree intervals;
    f. a washing arm motor supported by the movable support member for movement therewith, the washing arm motor being coupled to the washing arm for selectively rotating the washing arm and the index plate secured thereto for selectively rotating the washing arm to sweep the spray nozzles around a corner of the vehicle to be washed and
    g. a position sensor secured to the movable support member proximate to the index plate and responsive to the four index positions for indexing the washing arm at one of four orientations.

16. The vehicle washing apparatus recited by claim 15, wherein the washing arm motor is responsive to the position sensor for discontinuing further rotation of the washing arm.

17. The vehicle washing apparatus recited by claim 16 wherein the position sensor is a proximity switch for sensing the relative rotational position of the index plate.

18. The vehicle washing apparatus recited by claim 15 wherein the generally circular index plate has an outer periphery, the outer periphery having four grooves formed respectively at ninety degree intervals; and the vehicle washing apparatus further including a roller in contact with the outer periphery of the index plate, and engaging one of the four grooves, for indexing the washing arm at one of four orientations.

19. The vehicle washing apparatus recited by claim 18 wherein the index plate outer periphery has a flattened region adjacent each of the four grooves formed therein, and wherein the roller may be displaced from a groove of the index plate onto the corresponding adjacent flat for allowing the washing arm to rotate in a first direction while resisting rotation of the washing arm in an opposite direction.

20. A vehicle washing apparatus comprising in combination:
    a. a vehicle washing bay for accommodating a vehicle to be washed;
    b. a generally inverted L-shaped washing arm having a generally horizontal portion and a generally vertical portion, the generally vertical portion including spray nozzles for directing cleaning fluid at vertical surfaces of the vehicle to be washed;
    c. a movable support member for supporting the washing arm above the vehicle washing bay, the movable support member being adapted to be moved generally between the rear end and the front end of the washing bay for positioning the washing arm at different points within the vehicle washing bay;
    d. a bearing for rotatably supporting the washing arm relative to the movable support member about a substantially vertical axis of rotation;
    e. a generally circular index plate secured to the washing arm, the circular index plate having four index positions formed respectively at ninety degree intervals;
    f. a position sensor secured to the movable support member proximate to the index plate and responsive to the four index positions for indexing the washing arm at one of four orientations; and
    g. a coupling joint for joining the vertical portion of the washing arm to the horizontal portion thereof, the coupling joint including a spring-biased detent for ordinarily maintaining the vertical and horizontal portions of the washing arm at a predetermined angle relative to one another during operation of the vehicle washing apparatus, the spring-biased detent yielding under applied force to permit the vertical and horizontal portions of the washing arm to deviate from said predetermined angle should the vertical portion of the washing arm contact the vehicle to be washed.

21. A vehicle washing apparatus comprising in combination:
    a. a vehicle washing bay for accommodating a vehicle to be washed;
    b. a generally inverted L-shaped washing arm having a generally horizontal portion and a generally vertical portion, the generally vertical portion including spray nozzles for directing cleaning fluid at vertical surfaces of the vehicle to be washed;

c. a movable support member for supporting the washing arm above the vehicle washing bay, the movable support member being adapted to be moved generally between the rear end and the front end of the washing bay for positioning the washing arm at different points within the vehicle washing bay;

d. a bearing for rotatably supporting the washing arm relative to the movable support member about a substantially vertical axis of rotation;

e. a generally circular index plate secured to the washing arm, the circular index plate having four index positions formed respectively at ninety degree intervals;

f. a position sensor secured to the movable support member proximate to the index plate and responsive to the four index positions for indexing the washing arm at one of four orientations; and g. a coupling joint for joining the vertical portion of the washing arm to the horizontal portion thereof, the coupling joint including a spring-biased detent for ordinarily maintaining the vertical portion of the washing arm substantially parallel to the vertical axis of rotation during operation of the vehicle washing apparatus, the spring-biased detent yielding under applied force to permit the vertical portion of the washing arm to extend at an angle relative to the vertical axis of rotation should the vertical portion of the washing arm contact the vehicle to be washed.

* * * * *